(12) United States Patent
Reddy et al.

(10) Patent No.: US 9,701,213 B2
(45) Date of Patent: *Jul. 11, 2017

(54) SYSTEM AND METHOD FOR DETECTING VEHICLE PROXIMITY IN AN ELECTRIC VEHICLE SUPPLY EQUIPMENT

(71) Applicant: SemaConnect, Inc., Bowie, MD (US)

(72) Inventors: Mahidhar Reddy, Annapolis, MD (US); Harsha Kollaramajalu, Bangalore (IN); Gurdarshan Singh Tiwana, Bangalore (IN); Vincent J. Kayser, Lothian, MD (US); Joseph Engel, Monroeville, PA (US); Roman Stanchak, Baltimore, MD (US)

(73) Assignee: SemaConnect, Inc., Bowie, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,258

(22) Filed: Sep. 13, 2016

(65) Prior Publication Data

US 2017/0001530 A1   Jan. 5, 2017

Related U.S. Application Data

(63) Continuation of application No. 13/886,801, filed on May 3, 2013, now Pat. No. 9,440,549.

(51) Int. Cl.
*G06F 19/00* (2011.01)
*B60L 11/18* (2006.01)
(Continued)

(52) U.S. Cl.
CPC ....... *B60L 11/1824* (2013.01); *B60L 11/1818* (2013.01); *B60L 11/1825* (2013.01); *B60L 11/1827* (2013.01); *B60L 11/1846* (2013.01); *B60Q 9/008* (2013.01); *G01V 8/10* (2013.01); *B60L 2230/16* (2013.01); *B60L 2240/70* (2013.01); *B60L 2250/10* (2013.01); *B60L 2270/32* (2013.01); *B60L 2270/34* (2013.01); *Y02T 10/7005* (2013.01); *Y02T 10/7088* (2013.01); *Y02T 10/7291* (2013.01); *Y02T 90/121* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
None
See application file for complete search history.

(56) References Cited

U.S. PATENT DOCUMENTS 7,999,506 B1 * 8/2011 Hollar et al. ............. 320/104
9,440,549 B2 * 9/2016 Reddy et al. ............. 340/941
(Continued)

*Primary Examiner* — Brent Swarthout
(74) *Attorney, Agent, or Firm* — Vector IP Law Group; Robert S. Babayi

(57) ABSTRACT

A system and method is provided for detecting vehicle proximity in an electric vehicle supply equipment (EVSE). A sensor may be configured to detect a presence of a vehicle within a predetermined distance of the EVSE. A processor may be configured to determine that the vehicle is in proximity of the EVSE in response to the sensor detecting the presence of the vehicle. The processor may be further configured to generate an alert in response to a determination that the vehicle is in proximity of the EVSE.

6 Claims, 3 Drawing Sheets

(51) Int. Cl.
  *B60Q 9/00*  (2006.01)
  *G01V 8/10*  (2006.01)

(56) References Cited

U.S. PATENT DOCUMENTS

| | | | |
|---|---|---|---|
| 2011/0221387 A1* | 9/2011 | Steigerwald | B60L 11/182 320/108 |
| 2014/0035526 A1* | 2/2014 | Tripathi | B60L 11/1838 320/109 |
| 2015/0202971 A1* | 7/2015 | Taniguchi | B60L 11/182 320/108 |

* cited by examiner

SYSTEM AND METHOD FOR DETECTING VEHICLE PROXIMITY IN AN ELECTRIC VEHICLE SUPPLY EQUIPMENT

TECHNICAL FIELD

The present disclosure relates to the field of electric vehicle supply equipments. More specifically, the present disclosure relates to detecting vehicle proximity in electric vehicle supply equipments.

BACKGROUND

An electric vehicle supply equipment supplies electric energy for charging/recharging of electric vehicles plugged into the equipment. Vehicle detection systems exist. However, an efficient way to detect vehicle proximity to an electric vehicle supply equipment is needed.

These and other drawbacks exist.

BRIEF SUMMARY

Various systems, computer program products, and methods for detecting vehicle proximity in an electric vehicle supply equipment (EVSE) are described herein.

According to one aspect of the present disclosure, the method may include a plurality of operations. In some implementations, the operations may include detecting, via a sensor, a presence of a vehicle within a predetermined distance of the EVSE. In some implementations, the operations may include determining, by at least one computing processor coupled to the sensor, that the vehicle is in proximity of the EVSE in response to the sensor detecting the presence of the vehicle. In some implementations, the operations may include generating, by the at least one computing processor, an alert in response to determining that the vehicle is in proximity of the EVSE.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
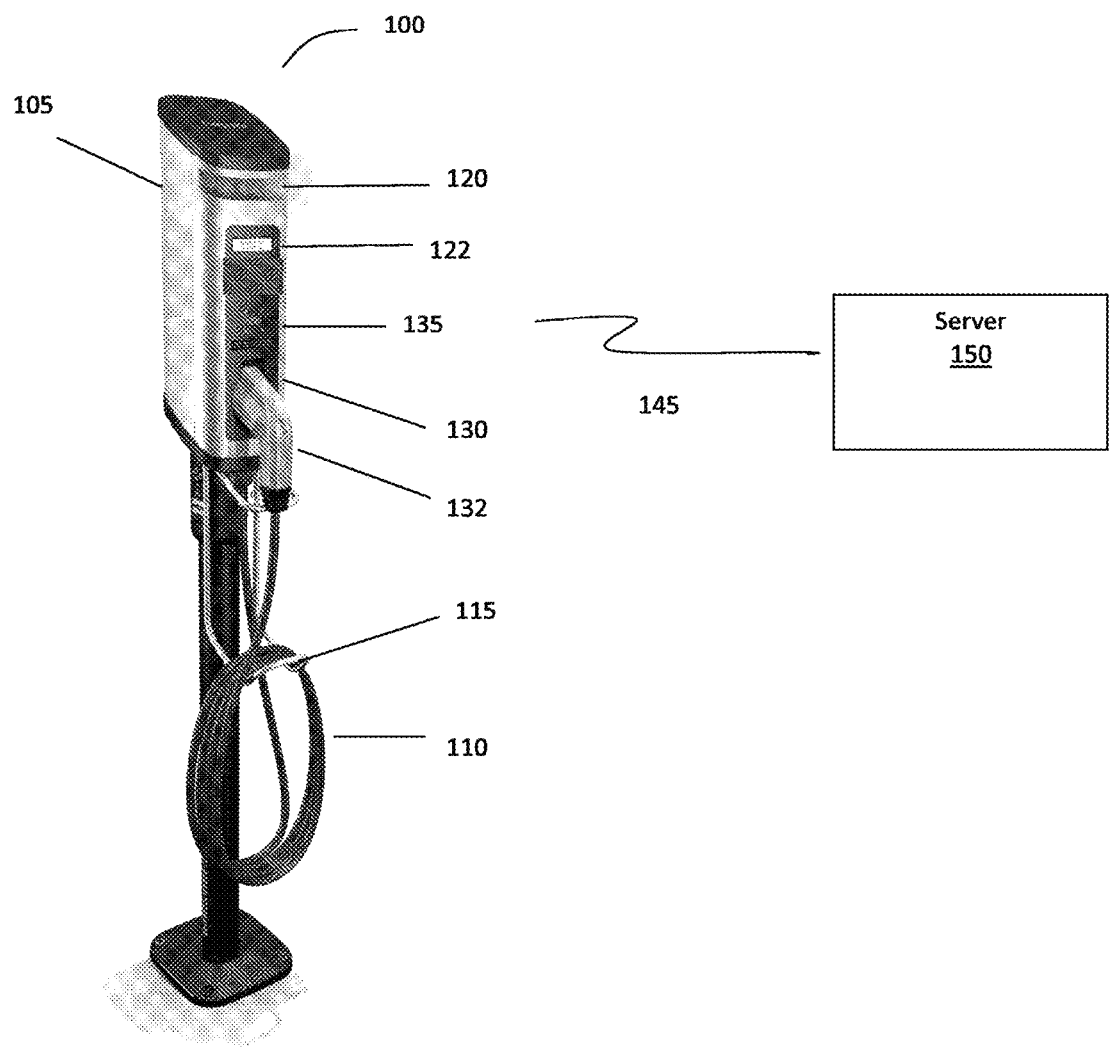
FIG. 1 illustrates an exemplary electric vehicle supply equipment, according to various aspects of the invention.

FIG. 1 illustrates an exemplary electric vehicle supply equipment (EVSE) 100, according to various aspects of the invention. EVSE 100 may include an enclosure 105 that houses one or more components of the EVSE 100. Externally, enclosure 105 may include, among other things, LED (light emitting diode) lights 120, a display screen 122 (for example, liquid crystal display or other display), an opening 130 that accepts a J1772 plug 132 that is capable of charging electric and plug-in hybrid electric vehicles, and an authentication interface 135 that is configured to capture identifying information associated with the vehicle and/or a driver of the vehicle.

EVSE 100 may include a cord 110 of a particular length that ensures easy charging access over and around the electric vehicle. In some implementations, the cord length may be 18 feet, though other cord lengths may be used without departing from the scope of the invention. In some implementations, cord 110 may include one or more cables used to supply electric energy for charging/recharging of electric vehicles plugged into the EVSE 100.

EVSE 100 may include a bracket 115 for coiling/storing cord 110 after a charging session (i.e., after charging of a vehicle). In some implementations, the bracket 115 may be formed of stainless steel, though other materials may be used without departing from the scope of the invention.

In some implementations, EVSE 100 may be communicatively coupled to remote server 150 via link or network 145. In some implementations, link or network 145 may include a Local Area Network, a Wide Area Network, a cellular communications network, a Public Switched Telephone Network, a wireless communication network, and/or other network or combination of networks.

Figure 2:
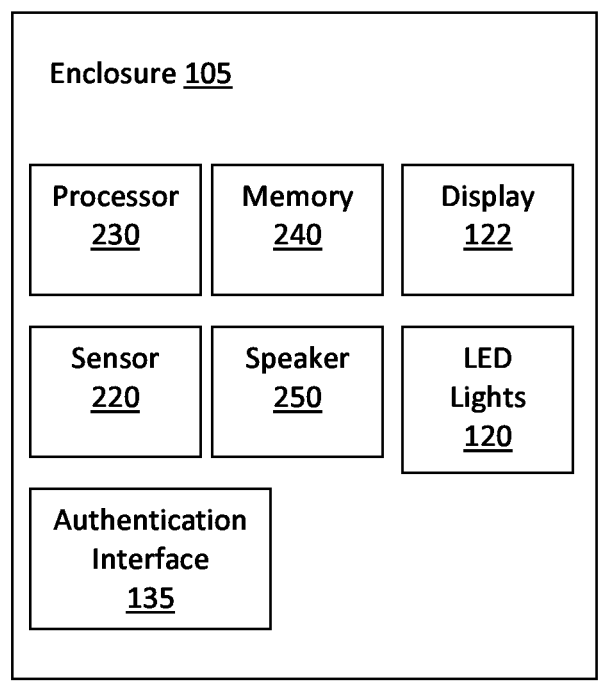
FIG. 2 illustrates components of an enclosure of the electric supply equipment, according to various aspects of the invention.

In some implementations, as depicted in FIG. 2, enclosure 105 of EVSE 100 may include a sensor 220, a processor 230, a memory 240, display screen 122, speaker 250, LED lights 120, authentication interface 135, and/or other components that facilitate the functions of EVSE 100. In some implementations, processor 230 includes one or more processors configured to perform various functions of EVSE 100. In some implementations, memory 240 includes one or more tangible (i.e., non-transitory) computer readable media. Memory 240 may include one or more instructions that when executed by processor 230 configure processor 230 to perform functions of EVSE 100.

In some implementations, sensor 220 may be configured to detect a presence of a vehicle within a predetermined distance of the EVSE 100. In some implementations, sensor 220 may be mounted or attached to enclosure 105 and may be coupled to the processor 230. In some implementations, sensor 220 may include a ranging sensor. A ranging signal transmitted by the ranging sensor may be reflected by a vehicle approaching the EVSE 100. The reflected ranging signal may be used to detect the presence of the vehicle within a particular distance of the EVSE 100. In some implementations, the ranging sensor may be configured to operate based on radio frequency spectrum, an audio spectrum, visible and/or non-visible light.

In some implementations, sensor 220 may include an imaging sensor (for example, in a video camera) configured to detect a presence of a vehicle within a predefined area (or distance) visible via the sensor. In some implementations, the predefined area may include a parking space. In some implementations, the imaging sensor may be configured to detect the presence of the vehicle within 20 feet of the EVSE. In some implementations, the imaging sensor may be configured to the capture a plurality of video images of the predefined area, analyze the captured video images, and detect the presence of the vehicle based on the analysis (for example, detect that a vehicle has entered, parked in, or exited a parking spot).

In some implementations, sensor 220 may include a magnetic sensor configured to use magnetic fields. The magnetic sensor may include a loop of wire embedded in the pavement, road, and/or parking space. In some implementations, the loop is energized from a high frequency voltage source while the coil current is measured. When a vehicle is parked over the coil the coil's inductance will increase resulting in a decrease in coil current. This is caused by vehicle's steel frame, wheels, etc. The decrease in current indicates a presence of a vehicle.

In some implementations, the coil may be energized from a current source. In these implementations, the increase in coil inductance caused by the vehicle will increase the coil's voltage.

In some implementations, processor 230 may be configured to determine that the vehicle is in proximity of the EVSE 100 in response to the sensor detecting the presence of the vehicle. In some implementations, sensor 220 may communicate a sensing signal to the processor 230 indicating that the presence of a vehicle has been detected. In some implementations, processor 230 may receive the sensing signal and determine that the vehicle is in proximity of the EVSE 100.

In some implementations, in response to a determination that the vehicle is in proximity of the EVSE 100, processor 230 may generate at least one alert. In some implementations, the alert may include an audible alert. In some implementations, EVSE 100 may include a speaker 250 that is configured to provide the audible alert. The audible alert may be in the form of a male/female voice sounding a verbal alert, and/or other audible alerts. In some implementations, the alert may include a visual alert. In some implementations, LED lights 120 and/or display screen 122 may be used to provide visual alerts. In some implementations, LED lights 120 may produce a light pattern to indicate that a vehicle is in proximity of the EVSE 100. In some implementations, display screen 122 may display a visual message for the driver of the vehicle in response to the determination that the vehicle is in proximity of the EVSE 100. In some implementations, the alert may include a message communicated by EVSE 100 to remote server 150 regarding the vehicle's presence/proximity at/to the EVSE 100.

In some implementations, the alert may include a notification to a driver of the vehicle determined to be in proximity of the EVSE 100 to provide identifying information. In some implementations, identifying information may include identification of the driver, an identification of the vehicle, an account number, and/or other identifying information.

In some implementations, the notification may include a message for the driver to provide identifying information via authentication interface 135. In some implementations, identifying information may be provided by tapping a smart card, chip card, or other integrated circuit card (ICC) containing the identifying information (i.e., the card may store the identifying information) against the authentication interface 135. In some implementations, identifying information may be provided by bringing a contactless smart card, chip card, or other integrated circuit card (ICC) containing the identifying information in proximity of the authentication interface 135. In some implementations, authentication interface 135 may include a card reader that is configured to read the identifying information from the smart card (via radio frequency induction technology, for example).

In some implementations, the identification of the vehicle may be received by scanning and reading the vehicle's license plate (via an imaging sensor described above, for example).

In some implementations, authentication interface 135 may provide the obtained identifying information to processor 230. In some implementations, processor 230 may authenticate the driver and/or vehicle based on the obtained identifying information. In some implementations, processor 230 may determine that the driver and/or vehicle is legitimate based on the obtained identifying information. In some implementations, a list of users registered to use EVSE 100 may be stored in memory 240. In some implementations, a list of users and/or their vehicles may be stored in memory 240. In some implementations, processor 230 may compare the obtained identifying information with the list stored in the memory 240. In some implementations, processor 230 may determine that charging of the vehicle using the EVSE 100 may be initiated in response to a match. In some implementations, processor 230 may determine that the charging of the vehicle using the EVSE 100 may not be initiated if there is no match.

In some implementations, authentication interface 135 may communicate the obtained identifying information to remote server 150. In some implementations, server 150 may include a processor and memory (not otherwise illustrated in the Figures). In some implementations, the server processor may authenticate the driver and/or vehicle based on the obtained identifying information. In some implementations, the server processor may determine that the driver and/or vehicle is legitimate based on the obtained identifying information. In some implementations, a list of users registered to use EVSE 100 may be stored in the server memory. In some implementations, a list of users and/or their vehicles may be stored in the server memory. In some implementations, the server processor may compare the obtained identifying information with the list stored in the server memory. In some implementations, the server processor may determine that charging of the vehicle using the EVSE 100 may be initiated in response to a match. In some implementations, the server processor may determine that the charging of the vehicle using the EVSE 100 may not be initiated if there is no match.

In some implementations, the alert may include a notification to the driver of the vehicle that the driver and/or vehicle have been authenticated and to provide payment information for the charging transaction (i.e., charging of the vehicle). In some implementations, in response to a determination that the vehicle is in proximity of the EVSE 100 and/or in response to a determination that the driver and/or vehicle is legitimate, the alert to provide payment information may be provided. In some implementations, the driver may use the smart card to provide payment information (i.e., to pay for the charging transaction) via authentication interface 135.

In some implementations, when the requested payment information is received, another alert may be provided to the driver of the vehicle to initiate charging of the vehicle using the EVSE 100. Once charging is complete, the driver may be notified that the charging of the vehicle is complete and a payment amount (funds to pay for the charging transaction) is charged based on the payment information (obtained from the smart card, for example).

In some implementations, the smart card may be loaded with funds to pay for the charging transaction. In these implementations, authentication interface 135 may receive an indication of the preloaded funds in the smart card (i.e., payment information). Once charging is complete, the payment amount may be debited from the preloaded funds.

In some implementations, the payment information may include an account number associated with the driver. In these implementations, authentication interface 135 may obtain the account number associated with the driver from the smart card and may communicate the account number to server 150. In some implementations, server 150 may communicate with the appropriate financial institution to obtain the funds to pay for the charging transaction.

In some implementations, the alert may include a notification to the driver of the vehicle that a transaction time for paying for the charging transaction has been exceeded. In some implementations, the alert may include a notification to the driver of the vehicle that the driver has failed to provide identifying information and/or other requested information within a preset time period.

In some implementations, one or more of the above notifications may be provided via speaker 250 and/or display screen 122. In some implementations, one or more of the above notifications may be communicated to remote server 150.

Figure 3:
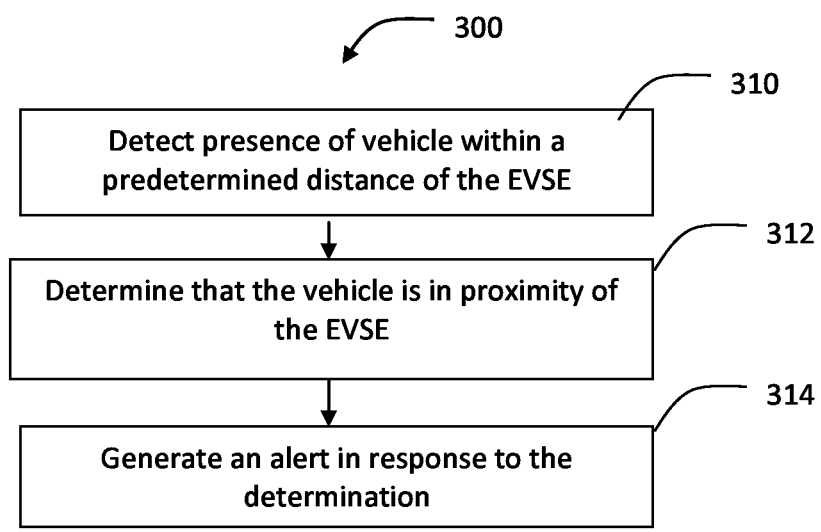
FIG. 3 illustrates a flowchart depicting example operations performed by an electric vehicle supply equipment, according to various aspects of the invention.

FIG. 3 is a flowchart 300 depicting example operations performed by the EVSE 100, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 3. In yet other implementations, one or more operations may be performed simultaneously. In yet other implementations, one or more operations may not be performed. Accordingly, the operations described are exemplary in nature and, as such, should not be viewed as limiting.

In an operation 310, process 300 may detect presence of a vehicle within a predetermined distance of the EVSE 100. In an operation 312, process 300 may determine that the vehicle is in proximity of the EVSE 100 in response to detecting the presence of the vehicle. In an operation 314, process 300 may generate at least one alert in response to the determination that the vehicle is in proximity of the EVSE 100.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An electric vehicle supply equipment (EVSE) for charging a vehicle by a user of the vehicle comprising:
   a cord having a predetermined distance between a vehicle and the EVSE that ensures charging access;
   one or more image sensors configured to detect a presence of a vehicle within the predetermined distance of the EVSE; wherein charging of the vehicle is performed based on vehicle identifying information obtained via the one or more image sensors;
   a processor configured to:
      determine that the vehicle is in proximity of the EVSE in response to detecting the presence of the vehicle; and
      generate an alert in response to a determination that the vehicle is in proximity of the EVSE;
      after the determination that the vehicle is in proximity of the EVSE, authenticate the user based on user identifying information; and
      initiate charging of the vehicle based on the authentication of the user and vehicle identifying information.

2. The equipment of claim 1, wherein the alert comprises an audible alert.

3. The equipment of claim 1, wherein the alert comprises a visual alert.

4. The equipment of claim 1, wherein the processor is further configured to communicate a message to a remote server regarding the proximity of the vehicle to the EVSE.

5. The equipment of claim 1, wherein the processor is further configured to generate a second alert that comprises a notification to the user of the vehicle to provide payment information for the charging of the vehicle, wherein the second alert is generated in response to user authentication.

6. The equipment of claim 1, wherein the alert comprises a notification to the user of the vehicle to provide the identifying information.

* * * * *